Patented Oct. 27, 1931

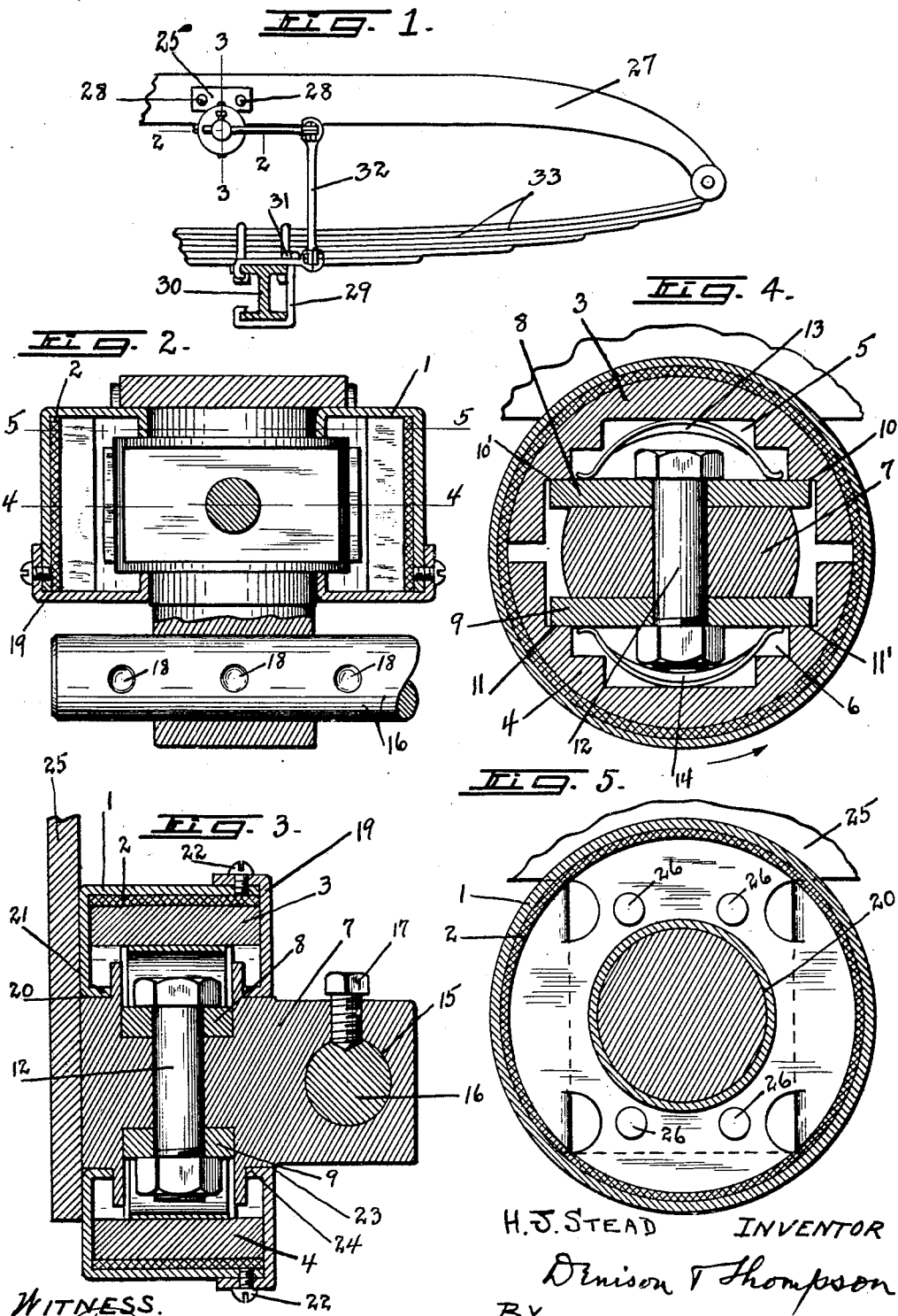

1,829,376

UNITED STATES PATENT OFFICE

HAROLD J. STEAD, OF GENEVA, NEW YORK, ASSIGNOR TO STEADFAST MFG. CO., INC., OF GENEVA, NEW YORK, A CORPORATION OF NEW YORK

SPRING CHECKING DEVICE

Application filed September 12, 1927. Serial No. 219,077.

This invention relates to a new and improved spring checking device for automobiles and other vehicles.

The usual method of constructing a vehicle is to place springs between the frame of the body and the axles so that the body will be yieldingly supported by and movable up and down with relation to the axles. This mode of construction allows the wheels of the vehicle to pass over irregularities in the road without transmitting the shock of the impact directly to the body, as would be the case if the body were rigidly secured to the axles. When an axle is raised by an inequality in the road, the spring will flex and the axle will approach the frame. The spring will then return to its normal position, lifting the frame away from the axle when so doing. This movement having once been started, the inertia of the spring will cause the movement to be repeated with a diminishing range of movement, with the result that one road shock to a wheel will cause several movements of the frame, and the main object of my invention is to provide a means whereby this continued movement of the spring will be substantially eliminated.

Another object is to provide a means whereby the movement of the spring in both directions will be controlled and uniform.

Other objects and advantages relate to the specific construction and form of part, all as will more fully appear from the following description, taken in connection with the accompanying drawings, in which:

Figure 1 is an elevation of parts of a frame, spring and axle of an automobile showing one of my devices installed thereon.

Figure 2 is a section on line 2—2 of Figure 1.

Figure 3 is a section on line 3—3 of Figure 1.

Figure 4 is a section on line 4—4, Figure 2.

Figure 5 is a section on line 5—5, Figure 2.

In the drawings like numbers refer to like parts.

My device consists of an outside case —1— circular in form open at one end and partially closed at the other, the partially closed end having a circular opening —20— with an inturned flange —21— into which one end of the rotor —7— (hereinafter described) is journaled.

The case —1— is made of steel or other appropriate material and is preferably lined on its inner periphery with a circular band —2— of brake-lining or other durable material. Brake-shoes —3— and —4—, approximately semi-circular in form, and of a shape to conform to the shape of the lining —3—, are positioned in opposed spaced relation within the case —1— and against lining —3—. The opposed faces of brake-shoes —3— and —4— are cut away, as indicated at —5— and —6— in Figure 4 to permit the insertion between them of rotor —7—.

Rotor —7— is provided with bearing surfaces —8— and —9— which bear respectively against bearing surfaces —10— and —10'— of brake-shoe —3—, and bearing surfaces —11— and —11'— of brake-shoe —4—. For the purpose of economy and to permit replacement, bearing surfaces —8— and —9— are formed of separate plates held in position on rotor —7— by means of bolt —12—, but it will be understood that such bearing surfaces could, if desired, be formed as an integral part of rotor —7—.

Spring —13— is interposed between bearing surface —8— and brake-shoe —3—, and spring —14— is interposed between bearing surface —9— and brake-shoe —4—, for the purpose of holding said brake-shoes at all times in contact with lining —2—. The outer end of rotor —7— is provided with a hole —15— for the reception of one end of lever —16—, and carries a set-screw —17— adapted to engage a depression —18— in lever —16—, there being a plurality, in this case three, of such depressions —18— to permit lateral adjustment of lever —16— with relation to rotor —7— for the purpose of increasing or decreasing the leverage on rotor —7—.

A cover —19—, fastened in position by screws —22— or other convenient means, has a circular opening —23— with an inturned flange —24— in which the outer end of rotor —7— is journaled. A bracket —25— is secured to the outside of the partially closed end of case —1— by rivets —26— or other convenient means, and is in turn attached to the frame —27— of the vehicle by rivets —28— or other convenient means. A clamp —29— is held in position on axle —30— by bolt —31— and is connected to the outer end of lever —16— by means of link —32—.

*Operation*

The operation of my device is as follows:
When a wheel strikes an inequality in the road, the axle —30— will move upwards towards frame —27— flexing spring 33. This will raise link —32— with relation to frame —27—, thereby raising the end of lever —16— and rotating the rotor —7—. The direction of this initial rotation of rotor —7— is indicated by the arrow in Figure 4. When this movement is taking place cam surface —8— will exert pressure against bearing surface —10—, and cam surface —9— will exert pressure against bearing surface —11—. The direction of these forces exerted by the cam surfaces —8— and —9— is oblique to the periphery of the outer faces of brake-shoes —3— and —4— respectively, and in consequence tends not only to move brake-shoes —3— and —4— around the inner periphery of lining —2—, but also tends to force them against lining —2—. The resulting friction between these parts tends to hold rotor —7— from rotating, and to that extent retards the action of spring —33—. Similarly, when the spring reacts to its former position, axle —30— will move away from frame —27— reversing the movement of rotor —7— and causing cam surface —8— to exert pressure in bearing surface —10'—, and cam surface —9— to exert pressure on bearing surface —11'—. This will cause the same retarding effect on rotor —7— as in the just described movement of rotation in the opposite direction.

It will be understood that the amount of pressure forcing the brake-shoes —3— and —4— against the lining —2— can be varied at will by changing the lengths of the cam surfaces —8— and —9— which in turn will change the direction of the forces exerted by them against the brake-shoes —3— and —4—.

Altho I have shown and described a specific structure and form of parts as illustrative of an embodiment of my invention, I do not desire to restrict myself to the exact form, shape or relation of parts, as various changes may be made within the scope of the appended claim.

I claim:

In a device of the class described, a casing, a plurality of rigid brake shoes in the casing in frictional contact therewith, a rotatable member having opposed flat surfaces respectively engaging the brake shoes at points spaced from one end of the brake shoes when rotated in one direction and engaging the brake shoes at points adjacent their opposite ends when rotated in the other direction, and means for rotating such rotatable member whereby the brake shoes will be moved in relation to the casing.

In witness whereof I have hereunto set my hand this 19th day of August 1927.

HAROLD J. STEAD.